US012189328B2

(12) United States Patent
Morita

(10) Patent No.: US 12,189,328 B2
(45) Date of Patent: Jan. 7, 2025

(54) IMAGE FORMING APPARATUS WITH AN INTERLOCKING MECHANISM FOR MOVING A HEATING UNIT

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/360,532

(22) Filed: Jul. 27, 2023

(65) Prior Publication Data

US 2024/0036510 A1 Feb. 1, 2024

(30) Foreign Application Priority Data

Jul. 28, 2022 (JP) ................................ 2022-120421

(51) Int. Cl.
*G03G 21/00* (2006.01)
*G03G 15/20* (2006.01)
*G03G 21/16* (2006.01)

(52) U.S. Cl.
CPC ..... *G03G 21/1647* (2013.01); *G03G 15/2053* (2013.01); *G03G 21/1685* (2013.01)

(58) Field of Classification Search
USPC ........................................................ 399/122
See application file for complete search history.

(56) References Cited

U.S. PATENT DOCUMENTS

2008/0025749 A1* 1/2008 Igarashi ............ G03G 21/1647 399/92
2021/0165352 A1* 6/2021 Sato .................. G03G 21/1685

FOREIGN PATENT DOCUMENTS

JP 2021086093 A 6/2021

* cited by examiner

*Primary Examiner* — Quana Grainger
(74) *Attorney, Agent, or Firm* — Alleman Hall & Tuttle LLP

(57) ABSTRACT

An image forming apparatus includes an apparatus main body, a heating unit, a fixing unit, a first cover member, an opening portion, a second cover member, an interlocking mechanism, an operating portion, and an operation portion. The operating portion is provided on a side surface of the apparatus main body and operates to turn ON or OFF a power supply. The operation portion is provided on the first cover member and operates the operating portion in a state where the first cover member is arranged at a first closed position.

6 Claims, 13 Drawing Sheets

IMAGE FORMING APPARATUS WITH AN INTERLOCKING MECHANISM FOR MOVING A HEATING UNIT

INCORPORATION BY REFERENCE

This application is based upon and claims the benefit of priority from the corresponding Japanese Patent Application No. 2022-120421 filed on Jul. 28, 2022, the entire contents of which are incorporated herein by reference.

The present disclosure relates to an electrophotographic image forming apparatus including a heating unit and a fixing unit.

BACKGROUND

The electrophotographic image forming apparatus transfers a toner image from an Image-carrying member onto a sheet, and fixes the toner image on the sheet by a fixing device.

The fixing device may be divided into a heating unit having a heater and a fixing unit having a fixing member and a pressure roller. The heater heats the fixing member.

In addition, the image forming apparatus is known to include a moving mechanism for moving the heating unit from a heating position to a retracted position. This image forming apparatus has an opening portion for removing the fixing unit from or inserting the fixing unit into the apparatus main body, and a cover member (opening and closing door) for opening and closing the opening portion. The moving mechanism moves the heating unit from the heating position to the retracted position in conjunction with the opening operation of opening the cover member. When the cover member is at the open position and the heating unit is retracted to the retracted position, the operator can pull out the fixing unit from the main body.

SUMMARY

An image forming apparatus according to an aspect of the present disclosure includes an apparatus main body, a heating unit, a fixing unit, a first cover member, an opening portion, a second cover member, an interlocking mechanism, an operating portion, and an operation portion. The heating unit is arranged along a first direction inside the apparatus main body. The heating unit has a heater. The fixing unit is arranged along the first direction so as to be adjacent to a side of the heating unit inside the apparatus main body. The fixing unit has a fixing member heated by the heater and a pressure member that applies a bias to a sheet toward the fixing member. The first cover member is supported by the apparatus main body so as to be rotatable between a first closed position that closes a side surface on one side in the first direction of the apparatus main body and a first open position that opens the side surface.

The opening portion is provided on the side surface inside the first cover member. The opening portion has an opening for attaching and detaching the fixing unit to and from the apparatus main body. The second cover member is provided on the side surface. The second cover member is supported by the apparatus main body so as to be rotatable between a second closed position that closes the opening portion and a second open position that opens the opening portion. The interlocking mechanism interlocks with a rotational motion of the second cover member rotating between the second closed position and the second open position, and moves the heating unit between a reference position where a contact portion of the heating unit contacts the fixing unit and a retracted position that is separated farther from the fixing unit than the reference position. The operating portion is provided on the side surface. The operating portion operates to turn ON or OFF a power supply. The operation portion is provided on the first cover member. The operation portion is capable of operating the operating portion in a state in which the first cover member is arranged at the first closed position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples of implementing techniques according to the present disclosure and do not limit the technical scope of the present disclosure.

[Configuration of Image Forming Apparatus 10]

Figure 1:
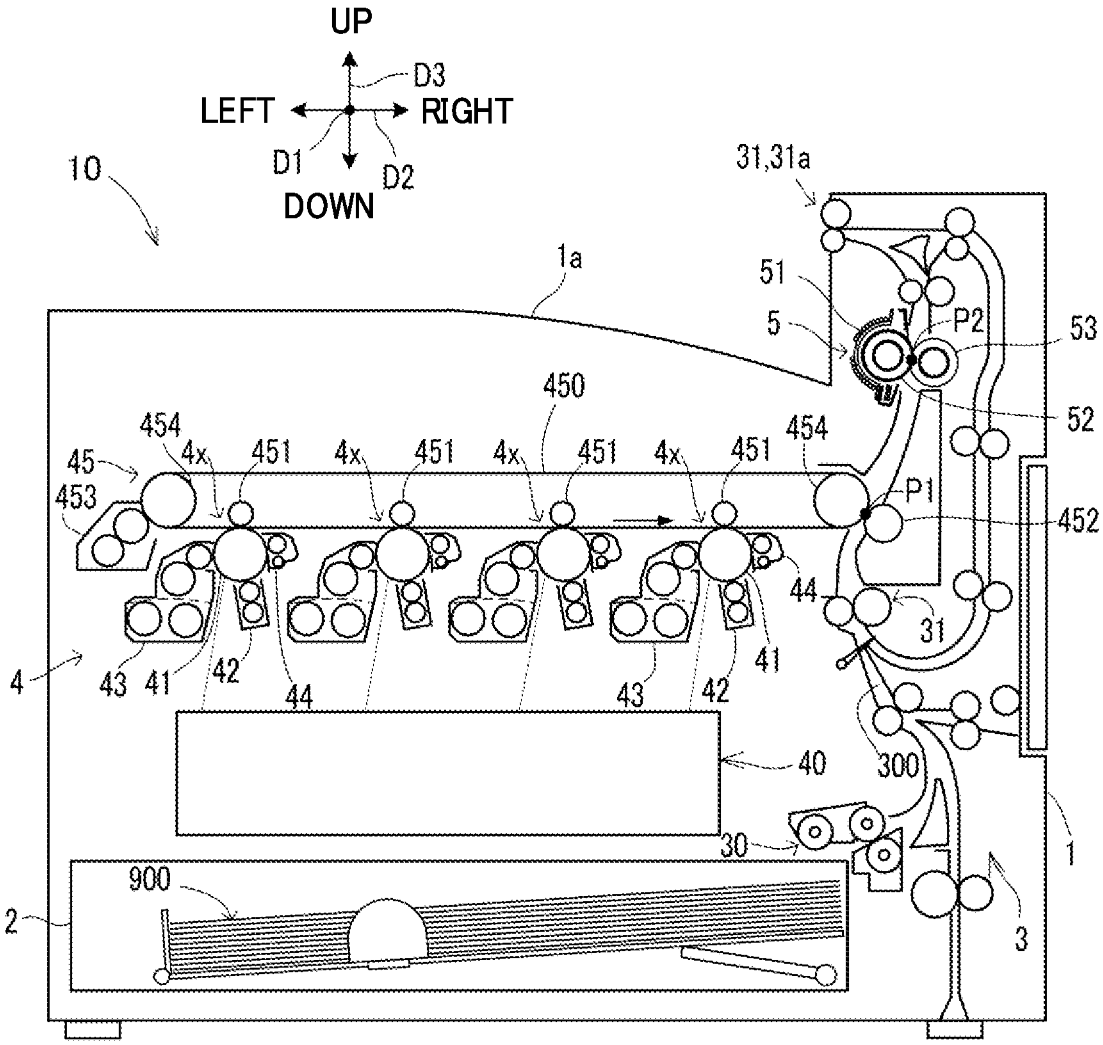
FIG. 1 is a configuration diagram of an image forming apparatus according to an embodiment.

FIG. 1 is a schematic diagram showing a configuration of an image forming apparatus 10 according to the present embodiment. The image forming apparatus 10 executes a printing process based on an electrophotographic method. The printing process is a process for forming an image on a sheet 900 (see FIG. 1).

Note that in the following description, an up-down direction D3 is defined with reference to a state in which the image forming apparatus 10 is installed as shown in FIG. 1, a front-rear direction D1 is defined with the front side of FIG. 1 being the front side of the image forming apparatus 10, and a left-right direction D2 or a width direction D2 is defined when the image forming apparatus 10 is viewed from the front.

Figure 12:
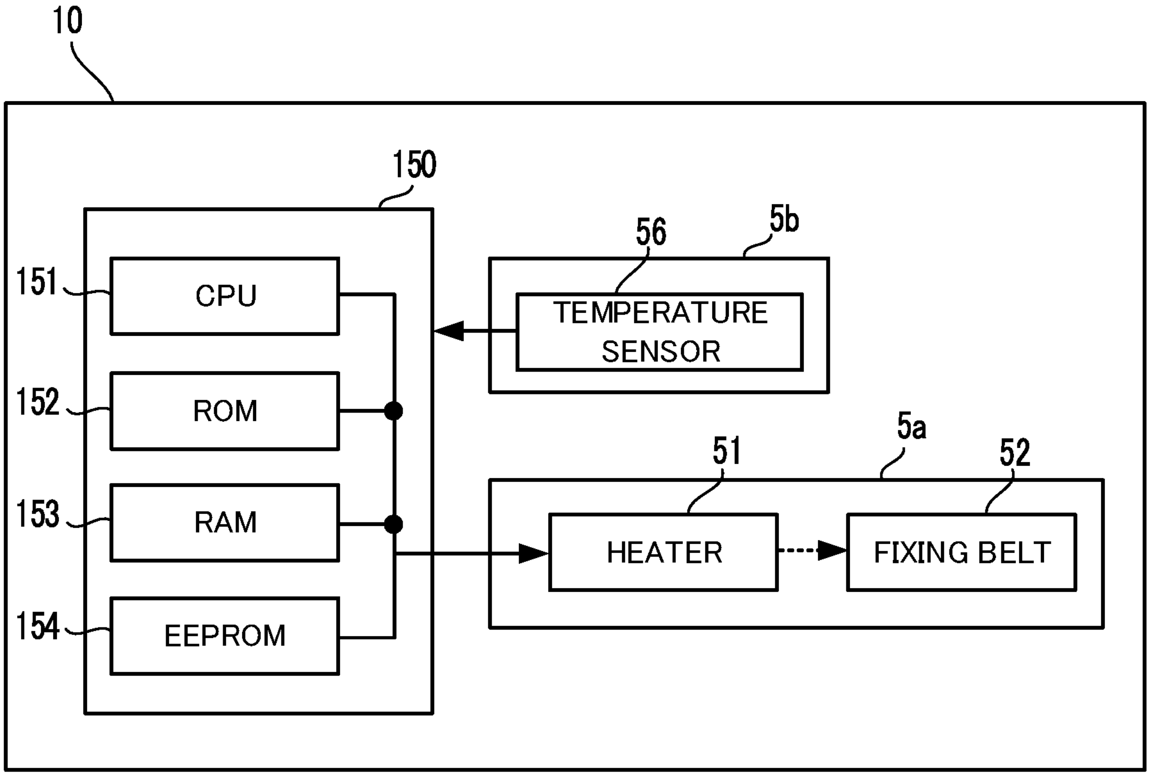
FIG. 12 is a block diagram showing a configuration of a control portion of the image forming apparatus according to the embodiment.

As shown in FIG. 1, the image forming apparatus 10 includes a sheet storing portion 2, a sheet conveying device 3, a printing device 4, and a control portion 150 (an example of a heating control portion according to the present disclosure, see FIG. 12). The sheet conveying device 3 and the printing device 4 are accommodated in a main body 1 (an example of the apparatus main body according to the present disclosure), which is a housing.

The sheet storing portion 2 can store a plurality of sheets 900. The sheet conveying device 3 includes a sheet feeding device 30 and a plurality of conveying roller pairs 31.

The sheet feeding device 30 feeds the sheets 900 in the sheet storing portion 2 to a conveying path 300 one sheet at a time. The conveying path 300 is a path for the sheets 900.

A plurality of conveying roller pairs 31 convey the sheets 900 along the conveying path 300. One conveying roller pair 31*a* out of the plurality of conveying roller pairs 31 discharges a sheet 900 on which an image is formed from the conveying path 300 to a discharge tray 1*a*.

The printing device 4 executes the printing process on the sheet 900 conveyed along the conveying path 300. The image formed on the sheet 900 is a toner image.

The printing device 4 includes an optical scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The optical scanning unit 40 scans the surface of the charged photoconductor 41 with a light beam. Thus, the optical scanning unit 40 forms an electrostatic latent image on the surface of the photoconductor 41.

The developing device 43 develops the electrostatic latent image into a toner image by supplying toner to the surface of the photoconductor 41. The transfer device 45 transfers the toner image formed on the surface of the photoconductor 41 onto the sheet 900.

The transfer device 45 transfers the toner image onto the sheet 900 at a transfer position P1 on the conveying path 300.

In the present embodiment, the printing device 4 is a tandem color printing device having a plurality of image forming portions 4*x*. In addition, the transfer device 45 also includes an intermediate transfer belt 450, a plurality of primary transfer devices 451, a secondary transfer device 452, and a belt cleaning device 453.

In the example shown in FIG. 1, the printing device 4 includes four image forming portions 4*x* corresponding to four colors of toner, yellow, magenta, cyan, and black. The transfer device 45 includes four primary transfer devices 451 corresponding to the four image forming portions 4*x*.

The intermediate transfer belt 450 is rotatably supported by a plurality of support rollers 454. One of the plurality of support rollers 454 is a drive roller, which is rotated by being driven by a belt driving device (not shown). Thus, the intermediate transfer belt 450 rotates.

Each primary transfer device 451 transfers the toner image formed on the surface of the photoconductor 41 in each of the image forming portions 4*x* to the surface of the intermediate transfer belt 450. Thus, a composite toner image, which is a combination of four color toner images, is formed on the surface of the intermediate transfer belt 450.

The intermediate transfer belt 450 rotates while carrying the composite toner image. The secondary transfer device 452 transfers the composite toner image formed on the surface of the intermediate transfer belt 450 onto the sheet 900 at the transfer position P1.

The drum cleaning device 44 removes primary waste toner from the surface of the photoconductor 41. The primary waste toner is toner remaining on a portion of the surface of the photoconductor 41 after passing through the primary transfer devices 451.

The belt cleaning device 453 removes secondary waste toner from the surface of the intermediate transfer belt 450. The secondary waste toner is toner remaining on a portion of the surface of the intermediate transfer belt 450 after passing through the secondary transfer device 452.

The fixing device 5 heats and presses the composite toner image on the sheet 900 at a fixing position P2 on the conveying path 300. Thus, the fixing device 5 fixes the composite toner image on the sheet 900. The fixing position P2 is located on a downstream side of the transfer position P1 in the sheet conveying direction.

Figure 2:
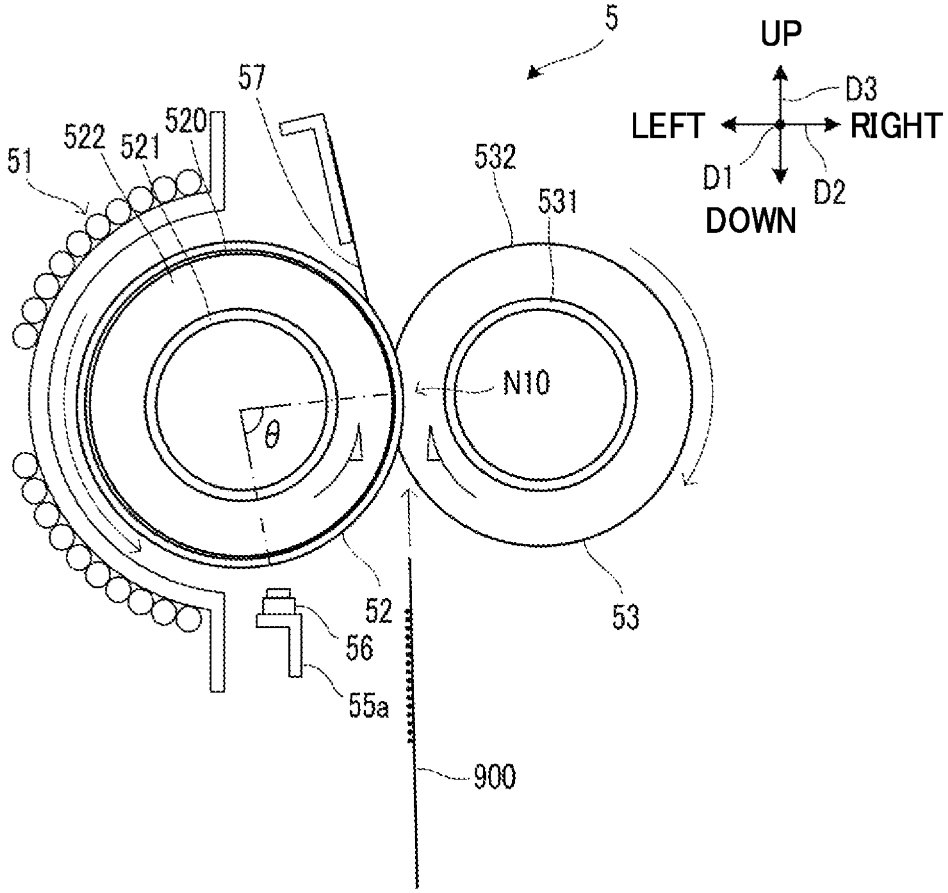
FIG. 2 is a diagram showing a configuration of relevant parts of the fixing device in the image forming apparatus according to the embodiment.

FIG. 2 is a diagram showing a configuration of relevant parts of the fixing device 5. As shown in FIG. 2, the fixing device 5 includes a heater 51, a fixing belt 52 (an example of a fixing member according the present disclosure), a fixing roller 520, a pressure roller 53 (an example of a pressure member according to the present disclosure), a temperature sensor 56 (an example of a temperature sensor according to the present disclosure), and a sheet separating member 57.

The fixing belt 52 is a flexible cylindrical member that includes a fixing roller 520. The fixing belt 52 is a fixing member heated by the heater 51.

The fixing roller 520 is a cylindrical member that supports the fixing belt 52 inside thereof. The fixing roller 520 has a cylindrical metal core portion 521 and an elastic portion 522 formed on an outer circumference of the metal core portion 521.

Figure 3:
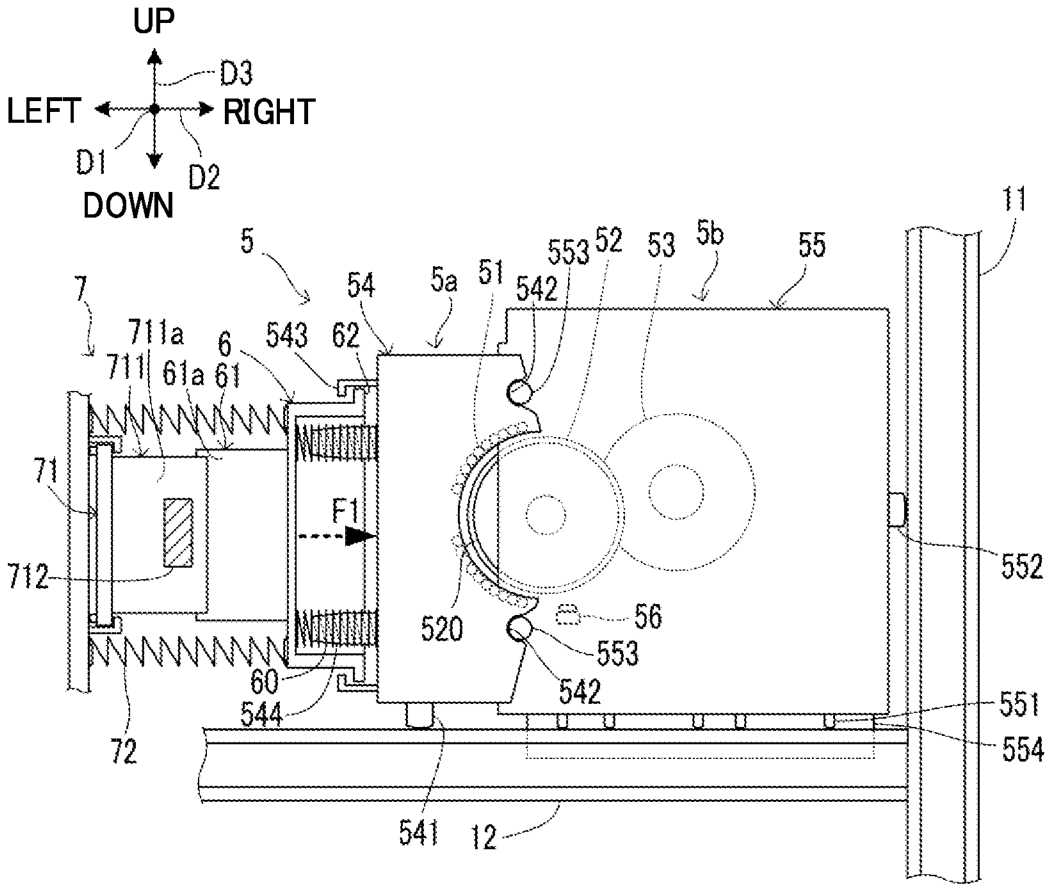
FIG. 3 is a front view of the fixing device and an interlocking mechanism in a biased state in the image forming apparatus according to the embodiment.

The fixing roller 520 is rotatably supported by a second support 55 (see FIG. 3). The fixing belt 52 is rotatable together with fixing roller 520.

The fixing belt 52 has a conductive base material, an elastic layer formed on an outer circumference of the base material, and a release layer formed on an outer circumference of the elastic layer.

The heater 51 is arranged to face an outer peripheral surface of the fixing belt 52. In this embodiment, the heater 51 is an electromagnetic induction heating type heating device, and is a so-called IH heater. The heater 51 mainly heats the base material of the fixing belt 52 by electromagnetic induction. Note that the heater 51 is not limited to heating by electromagnetic induction, and may heat the fixing belt 52 by another heating method.

The heater 51 is connected to the control portion 150 (see FIG. 12). In a case where a predetermined start condition is satisfied, the control portion 150 outputs a drive signal to the heater 51 to start heating by the heater 51, and controls the heater 51 so as to achieve a predetermined fixing temperature (target temperature). More specifically, the control portion 150 calculates a surface temperature of the fixing belt 52 based on a detection signal from a temperature sensor 56, which will be described later, and controls the heater 51 so that the calculated temperature becomes the fixing temperature. In addition, in a case where a predetermined stop condition is satisfied, the control portion 150 stops driving the heater 51 to stop heating by the heater 51.

The pressure roller 53 is rotatably supported. Similar to the fixing roller 520, the pressure roller 53 also has a cylindrical metal core portion 531 and an elastic portion 532 formed on an outer circumference of the metal core portion 531.

The pressure roller 53 is a pressure member that presses the sheet 900 against the fixing belt 52. In this embodiment, the pressure roller 53 is supported by a second support 55 (see FIG. 3), which will be described later, with the elastic portion 532 pressed against the fixing belt 52.

The pressure roller 53 is driven and rotated by a driving device (not shown). The fixing belt 52 and fixing roller 520 rotate in conjunction with the pressure roller 53.

The fixing belt 52 heats the toner image formed on the sheet 900. The pressure roller 53 presses the toner image toward the sheet 900.

When the sheet 900 is adhered to the fixing belt 52, the sheet separating member 57 separates the sheet 900 from the fixing belt 52.

The temperature sensor 56 is for detecting the surface temperature of the fixing belt 52. A temperature sensor 56 is provided around a fixing unit 5*b*. The temperature sensor 56 is attached to, for example, a bracket 55*a* (see FIG. 2) supported by the second support 55 (see FIG. 3) described later. The temperature sensor 56 is arranged at a position separated by a predetermined angle θ farther on the upstream side in the rotation direction of the fixing belt 52 than a nip portion N10, which is a contact portion where the fixing belt 52 and the pressure roller 53 come into contact. Thus, the temperature sensor 56 can detect the surface temperature of the fixing belt 52 before heat is taken away by the sheet 900 at the nip portion N10.

The temperature sensor 56 is a non-contact type temperature sensor. A non-contact type temperature sensor detects a surface temperature of an object (object to be detected) by measuring electromagnetic waves such as infrared rays emitted from the object, and is, for example, a thermopile. The temperature sensor 56 is arranged such that the sensor head that detects the infrared rays faces the outer peripheral surface of the fixing belt 52. The temperature sensor 56 is connected to the control portion 150 (see FIG. 12). A detection signal output from the temperature sensor 56 is sent to the control portion 150, and the control portion 150 calculates the surface temperature of the fixing belt 52 based on the detection signal. Note that the temperature sensor 56 may be either a non-contact type or a contact type as long as the temperature sensor 56 is used to detect the surface temperature of the fixing belt 52.

Figure 4:
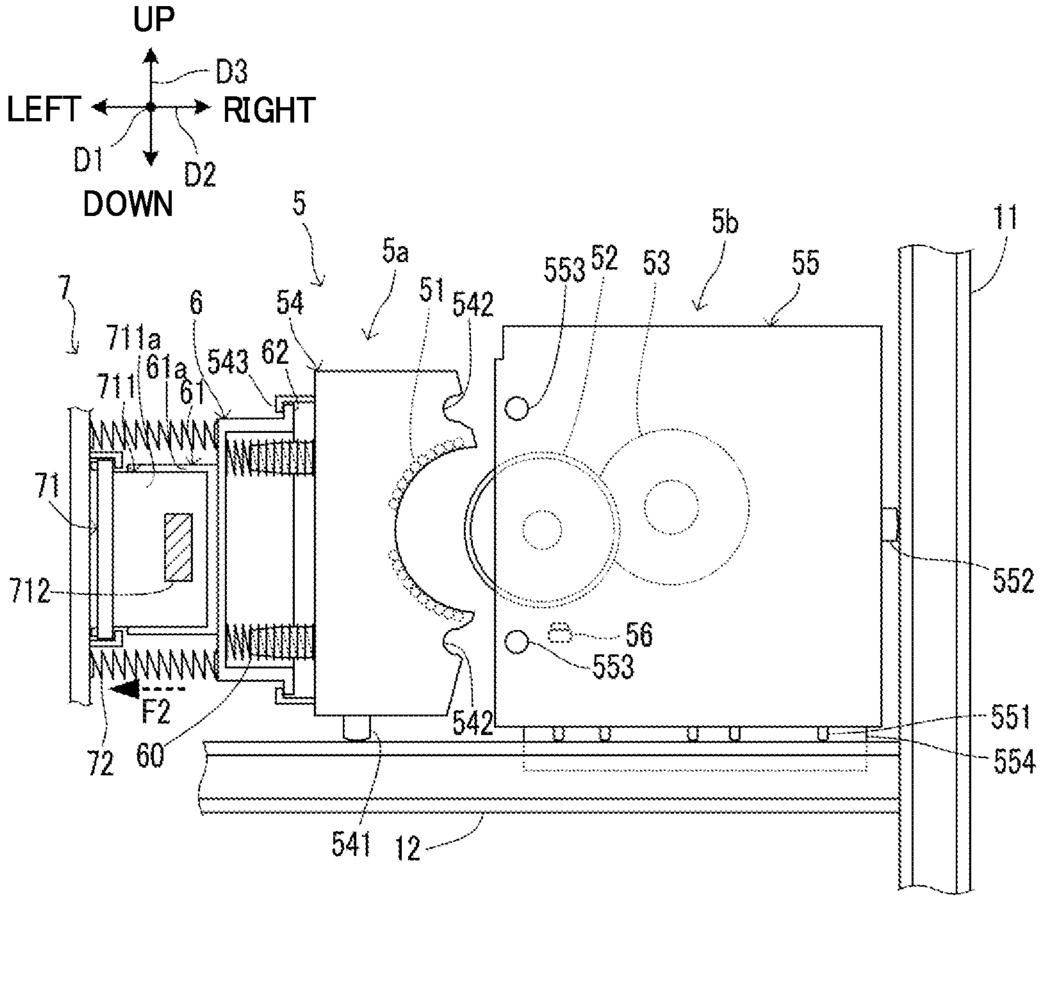
FIG. 4 is a front view of the fixing device and the interlocking mechanism in a retracted state in the image forming apparatus according to the embodiment.

FIG. 3 and FIG. 4 are diagrams showing a configuration of the fixing device 5. As shown in FIG. 3 and FIG. 4, in this embodiment, the fixing device 5 is divided into a heating unit 5*a* and a fixing unit 5*b*. The heating unit 5*a* is arranged inside the main body 1 along the front-rear direction D1. The fixing unit 5*b* is also arranged inside the main body 1 along the front-rear direction D1. Note that the front-rear direction D1 corresponds to a first direction according to the present disclosure.

The heating unit 5*a* has a heater 51 and a first support 54. The fixing unit 5*b* has a fixing belt 52, a fixing roller 520, a pressure roller 53 and a second support 55.

The first support 54 is a member that supports the heater 51. The second support 55 is a member that supports the fixing belt 52, the fixing roller 520, and the pressure roller 53. The fixing belt 52 is supported by the second support 55 via the fixing roller 520.

Figure 11:
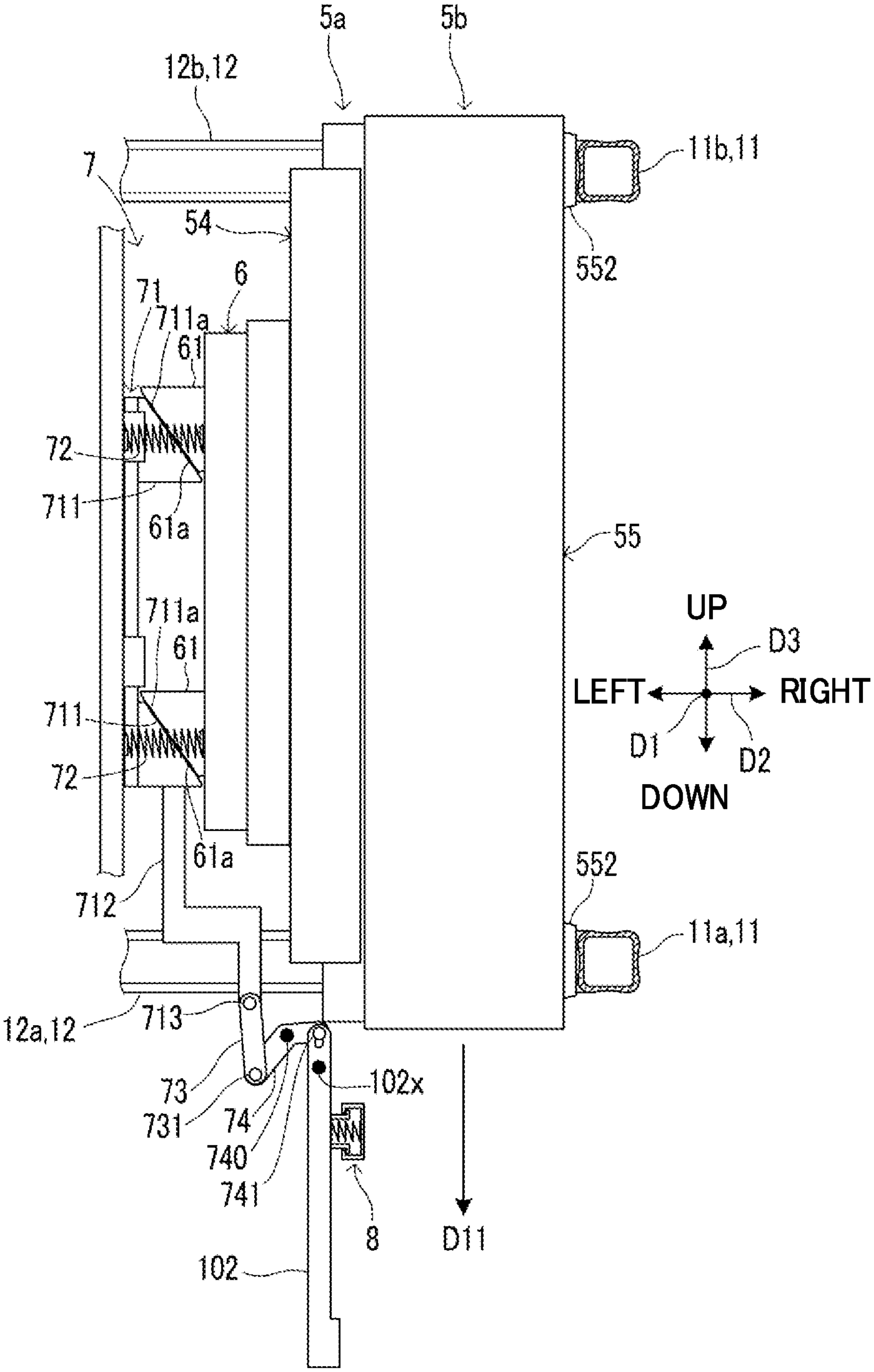
FIG. 11 is a plan view of the fixing device and the interlocking mechanism in a retracted state in the image forming apparatus according to the embodiment.

In this embodiment, the fixing unit 5*b* can be pulled out from the main body 1 by moving the heating unit 5*a* to a position separated away from the fixing unit 5*b* (position shown in FIG. 4) (see FIG. 11).

Figure 5:
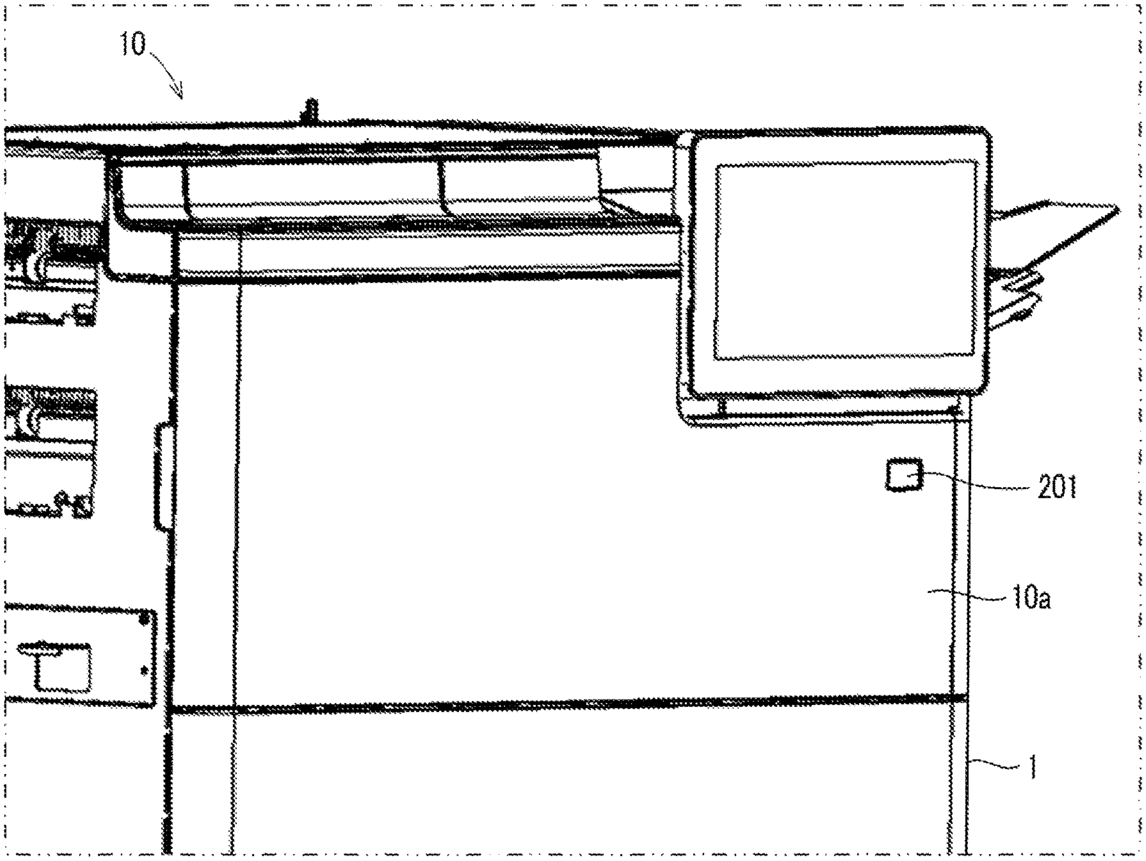
FIG. 5 is a perspective view showing a front side of the image forming apparatus according to the embodiment, and showing a state in which a front cover is closed.
Figure 6:
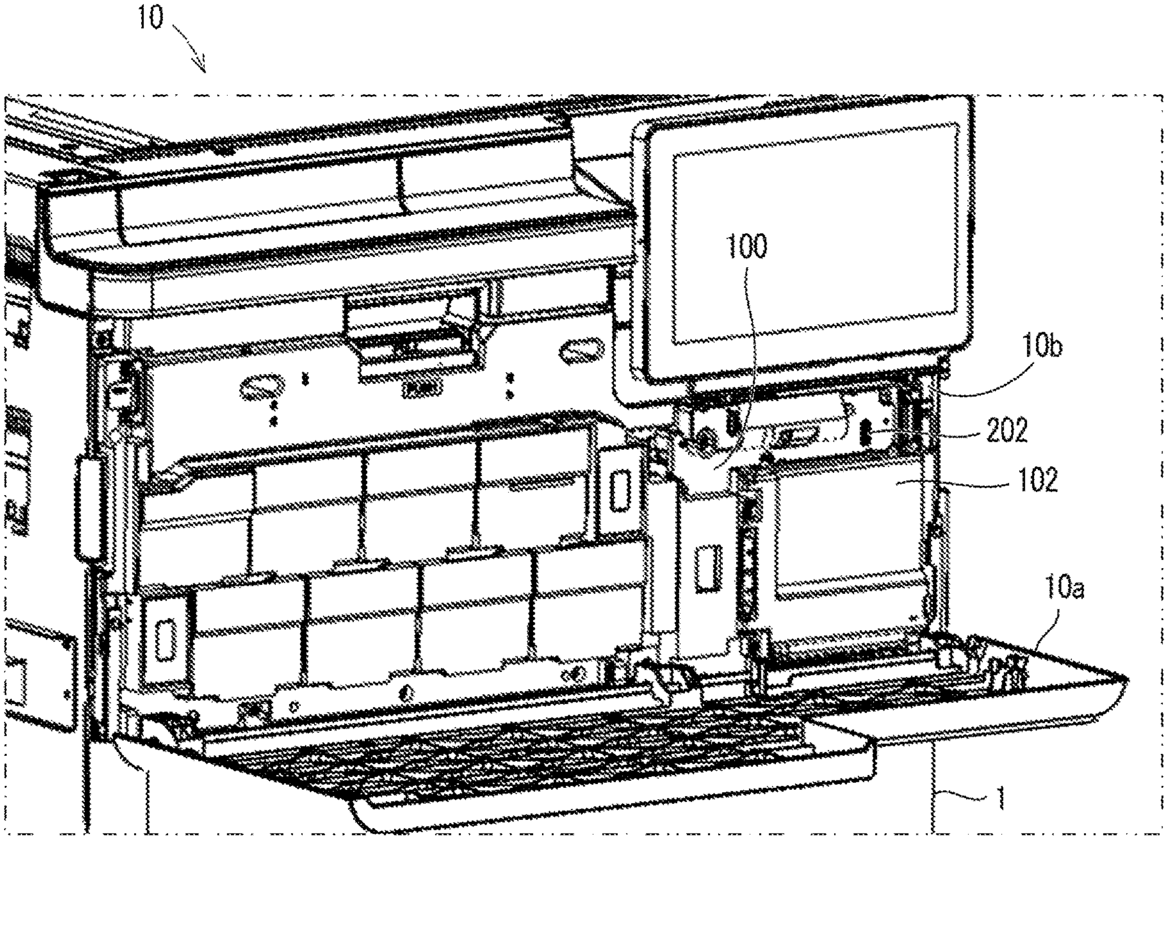
FIG. 6 is a perspective view showing the front side of the image forming apparatus according to the embodiment, and showing a state in which the front cover is opened.

FIG. 5 and FIG. 6 are perspective views showing the front side of the image forming apparatus 10. As shown in FIG. 5, the main body 1 has a front cover 10*a* (an example of a first cover member according to the present disclosure). FIG. 5 shows a state in which the front cover 10*a* is closed. The opening 10*b* (see FIG. 6) on the front side of the main body 1 is covered by the front cover 10*a*. Note that the front cover 10*a*, in a closed state, constitutes the front exterior of the image forming apparatus 10.

The front cover 10*a* is configured to be able to open and close the opening 10*b*. The front cover 10*a* is rotatably supported around a lower edge portion of the opening 10*b* as a fulcrum of rotation. Therefore, the front cover 10*a* can be rotated so as to fall forward from the closed state. The front cover 10*a* is rotatably supported between a first closed position (position shown in FIG. 5) that closes the opening 10*b* and a first open position (position shown in FIG. 6) that opens the opening 10*b*. When the front cover 10*a* is opened, a partition member 100, described later, is exposed.

As shown in FIG. 6, in the main body 1, the partition member 100 is provided inside the front cover 10*a*. The partition member 100 is a plate-shaped member that separates the inside of the main body 1 from the front side of the main body 1. In this embodiment, the partition member 100 is provided near the right end of the main body 1.

Figure 7:
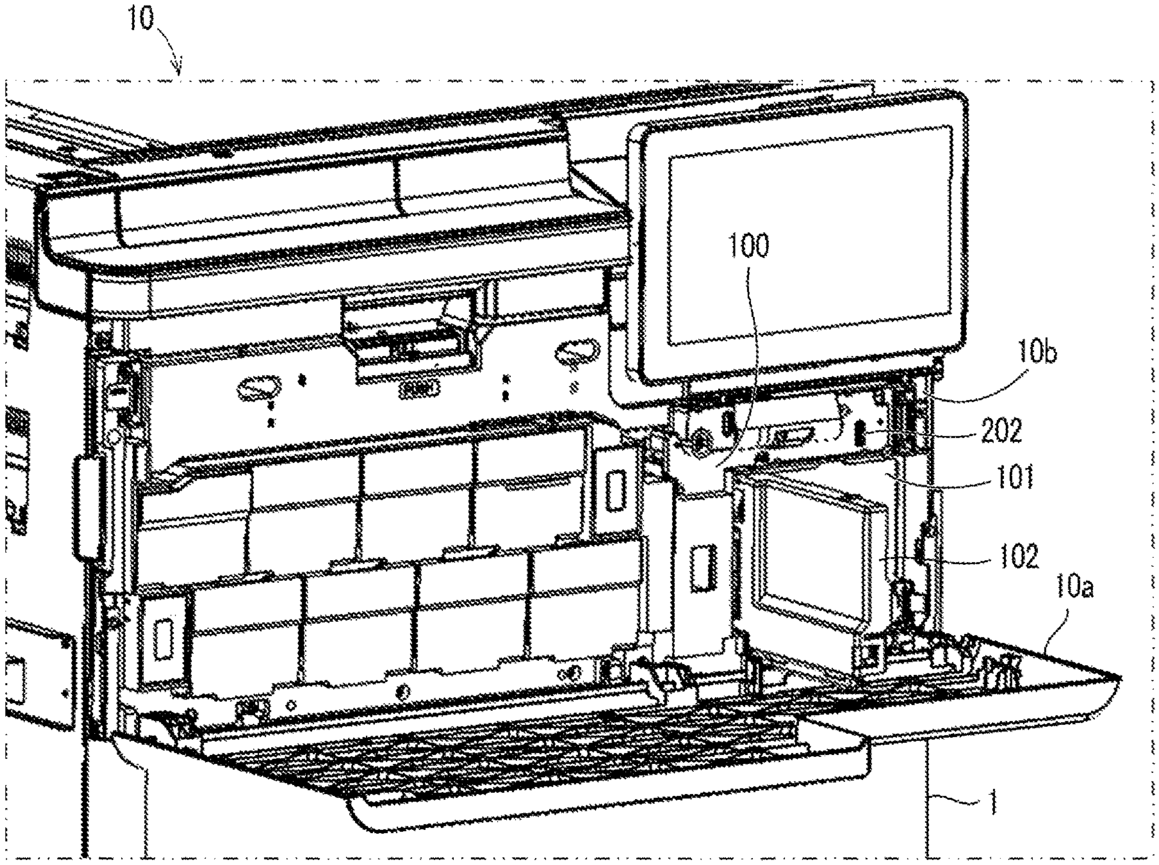
FIG. 7 is a perspective view showing the front side of the image forming apparatus according to the embodiment, and showing a state in which the front cover and an inner cover are opened.

As shown in FIG. 7, the partition member 100 has an opening portion 101 (an example of an opening portion according to the present disclosure) and an inner cover 102 (an example of a second cover member according to the present disclosure). Here, FIG. 7 is a perspective view showing the front side of the image forming apparatus 10, and showing a state in which the front cover 10*a* and the inner cover 102 are opened.

The opening portion 101 has an opening for attaching and detaching the fixing unit 5*b* to and from the main body 1. That is, the opening portion 101 includes an opening positioned on one side (front side) in the front-rear direction D1 in an accommodation space of the fixing unit 5*b*. Inside the main body 1, a space behind the opening portion 101 is an accommodation space in which the fixing unit 5*b* is detachably accommodated.

As shown in FIG. 5, the front cover 10*a* is provided with a power-supply operation portion 201 (an example of an operation portion according to the present disclosure) that is operated to turn ON or OFF the power supply to the image forming apparatus 10. In addition, as shown in FIG. 6, the partition member 100 is provided with an operating member 202 (an example of an operating portion according to the present disclosure) that operates in a case where the power supply is turned ON or OFF. The operating member 202 is a moving member that is movably supported between a conducting position, where an actuator of a power-supply switch (not shown) provided on the main body 1 is pushed to make the contact of the power-supply switch conductive, and a non-conducting position, where the contact of the power supply switch is disconnected by separating from the power-supply switch.

The power-supply operation portion 201 is provided at a position corresponding to the operating member 202. In other words, the power-supply operation portion 201 is provided at a position facing the operating member 202 when the front cover 10*a* is closed. Therefore, when an operator operates the power-supply operation portion 201 with the front cover 10*a* closed, the power-supply operation portion 201 presses the operating member 202, and the operating member 202 moves to the conducting position or the non-conducting position.

For example, in a case of a configuration in which the front cover 10*a* and the inner cover 102 are separately provided, even when the front cover 10*a* is closed, the internal cover 102 may be open. In this case, when the image forming apparatus 10 performs a printing operation, the temperature of the portion of the fixing belt 52 on the opening portion 101 side may drop, or dust may enter from the opening portion 101, resulting in deterioration of image quality. In addition, there is a possibility that the fixing unit 5*b* is not properly positioned in the front-rear direction D1, resulting in a positional deviation, which may degrade the image quality. On the other hand, by providing a mechanical or optical detection sensor to detect opening and closing of the inner cover 102, it is possible to detect that the inner cover 102 is an open state. However, providing a detection sensor that is used only to detect the opening and closing of the inner cover 102 is not preferable because doing so causes an increase in the number of parts of the image forming apparatus 10 and an increase in product cost.

On the other hand, in the image forming apparatus 10 of the present embodiment, the partition member 100 is provided with the inner cover 102, and the front cover 10*a* is further provided outside thereof. Therefore, the front cover 10*a* cannot be closed while the inner cover 102 is in an open state. Furthermore, in a case where the front cover 10*a* is not closed, even when the operator operates the power-supply operation portion 201, the power cannot be turned ON. Therefore, for example, even when the fixing unit 5*b* is remounted during maintenance or replacement of the fixing unit 5*b* and the operator forgets to close the inner cover 102, the operator can easily notice that closing the inner cover 102 was forgotten. Therefore, with the image forming apparatus 10, even when the operator forgets to close the inner cover 102, the operator can reliably close the inner cover 102.

Figure 8:
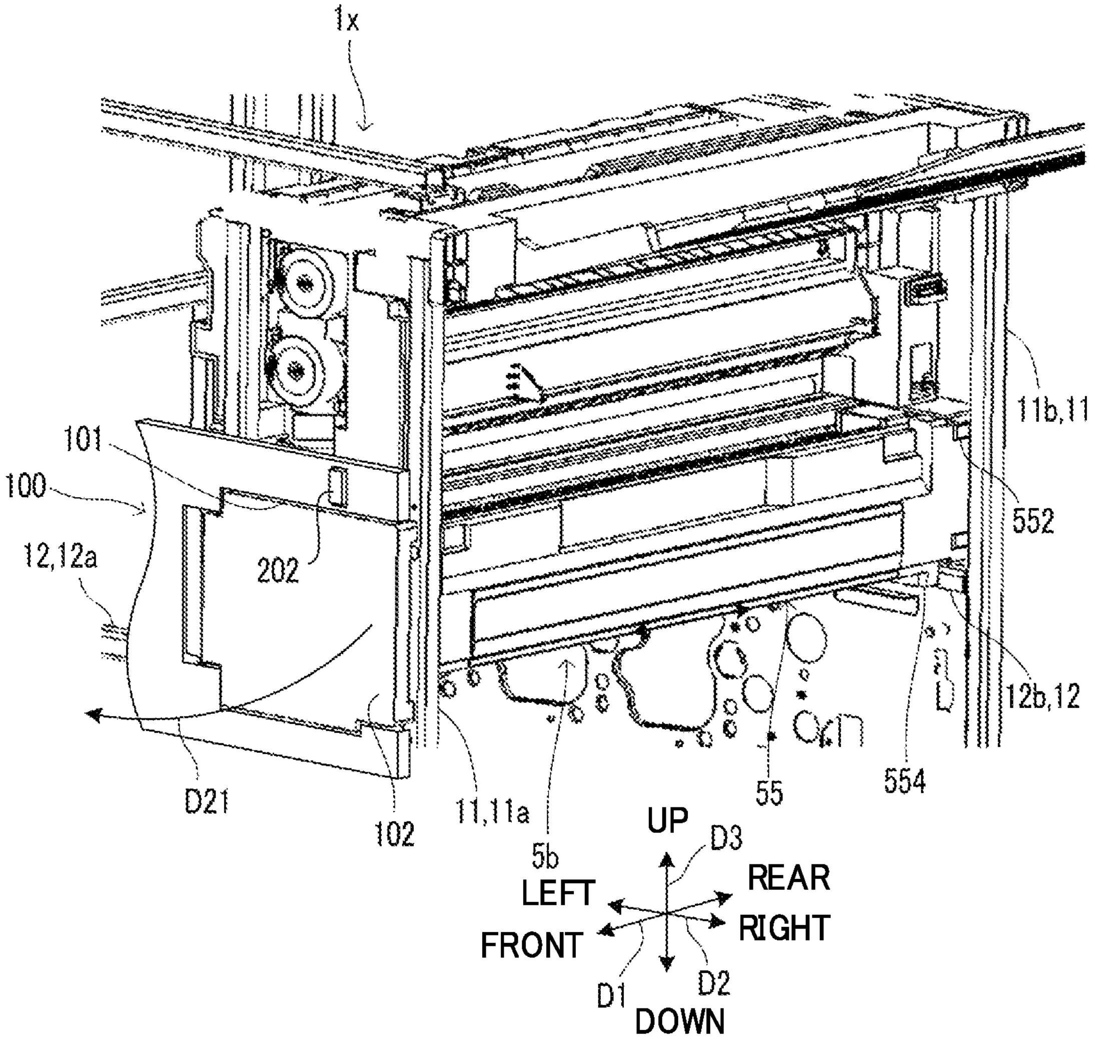
FIG. 8 is a perspective view of the peripheral portions of the fixing unit and the inner cover in the image forming apparatus according to the embodiment.

FIG. 8 is a perspective view of a peripheral portion around the fixing unit 5*b* and the inner cover 102 in the image forming apparatus 10. As shown in FIG. 8, the main body 1 includes a main body frame 1*x*. The main body frame 1*x* forms a skeleton of the main body 1. The partition member 100 is attached to the main body frame 1*x*.

The main body frame 1*x* is configured by combining a plurality of metal pipes. The heating unit 5*a* and the fixing unit 5*b* are supported by the main body frame 1*x*. The fixing unit 5*b* is arranged adjacent to a side of the heating unit 5*a*. In this embodiment, the fixing unit 5*b* is arranged on the right side of the heating unit 5*a*.

Figure 9:
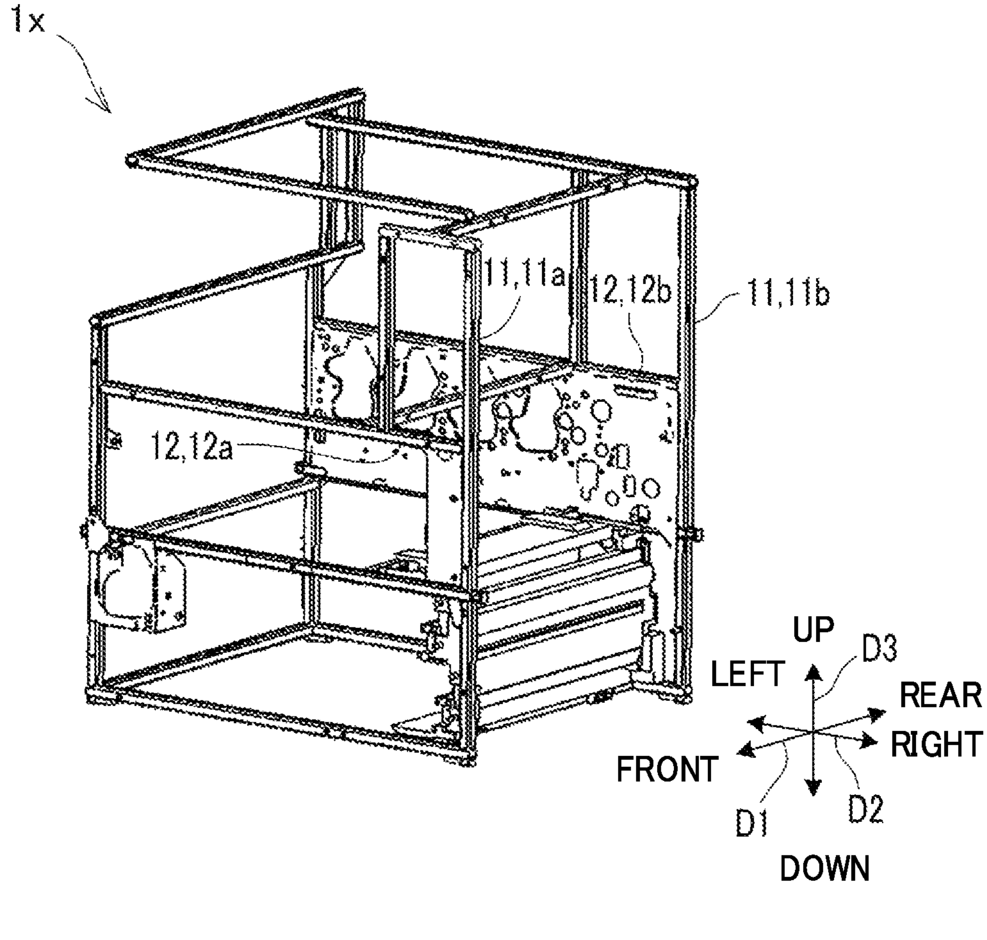
FIG. 9 is a perspective view of a main body frame in the image forming apparatus according to the embodiment.

FIG. 9 is a perspective view of the main body frame 1*x*. As shown in FIG. 9, the plurality of metal pipes forming the main body frame 1*x* has two supporting column portions 11 and two beam portions 12.

The two supporting column portions 11 are formed to extend in the up-down direction D3 and are spaced apart in the front-rear direction D1. The up-down direction D3 is the vertical direction or the height direction.

In addition, as shown in FIG. 8, the two supporting column portions 11 are formed extending in the up-down direction D3 on the side (right side) of the fixing unit 5*b*.

The front-rear direction D1 is also a direction along a center line of rotation of the fixing belt 52 and the pressure roller 53. In the present embodiment, the front-rear direction D1 is a depth direction of the image forming apparatus 10.

The inner cover 102 is supported by the main body 1 so as to be rotatable between a second closed position (position shown in FIG. 8) that closes the opening portion 101 and a second open position (position shown in FIG. 7) that opens the opening portion 101.

Figure 10:
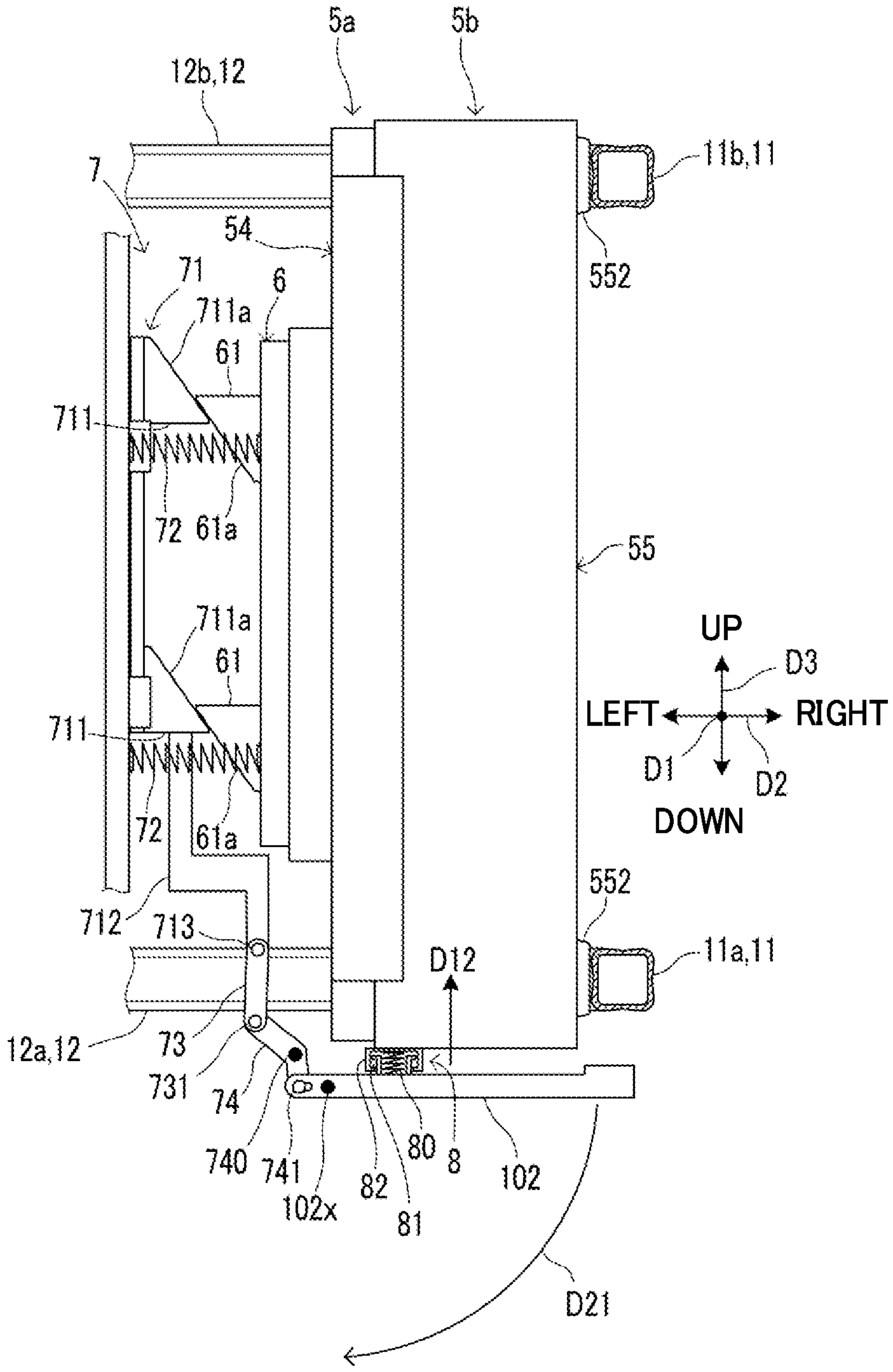
FIG. 10 is a plan view of the fixing device and the interlocking mechanism in the biased state in the image forming apparatus according to the embodiment.

FIG. 3 and FIG. 10 show the fixing device 5 when the inner cover 102 is positioned at the second closed position. FIG. 4 and FIG. 11 show the fixing device 5 when the inner cover 102 is positioned at the second open position.

As shown in FIG. 10 and FIG. 11, in this embodiment, the inner cover 102 has first supporting shafts 102*x* at the upper and lower ends of a left end portion thereof. The first supporting shaft 102*x* protrudes in a direction along the up-down direction D3. Shaft holes (not shown) through which the first supporting shafts 102*x* are inserted are formed at each of an upper edge portion and a lower edge portion of the opening portion 101. The inner cover 102 is supported by the first supporting shafts 102*x* by inserting the first supporting shafts 102*x* into the shaft holes. Thus, the inner cover 102 is rotatable about the first supporting shafts 102*x* in a direction indicated by an arrow D21 (see FIG. 10). More specifically, the inner cover 102 is rotatable between the second closed position that closes the opening portion 101 and the second open position that opens the opening portion 101.

When the inner cover 102 is positioned at the second closed position, the inner cover 102 is held at the second closed position by a locking mechanism (not shown). By unlocking the lock by the locking mechanism, the inner cover 102 can be rotated from the second closed position to the second open position.

It is important to arrange the heater 51 at an appropriate position with respect to the fixing belt 52 in order to increase the heating efficiency of the fixing belt 52 by the heater 51. In a case where an electromagnetic induction heating type heating device is employed as the heater 51, the accuracy of the position of the heater 51 is particularly important.

In addition, in order to allow the fixing unit 5*b* to be pulled out from the accommodation space inside the main body 1, a positioning mechanism of the heating unit 5*a* must have a proximity function and a retraction function.

The proximity function is a function of positioning the heating unit 5*a* at a reference position close to the fixing unit 5*b*. The retraction function is a function of moving the heating unit 5*a* to a retracted position away from the fixing unit 5*b*.

Therefore, in order to locate the heating unit 5*a* at the reference position with high accuracy, it is required that the mechanical play of the positioning mechanism does not adversely affect the positioning of the heating unit 5*a*.

The image forming apparatus 10 has a mechanism for positioning the heating unit 5*a* and the fixing unit 5*b* at target positions with high accuracy. With the image forming apparatus 10 of the present embodiment, the positioning mechanism for arranging the heating unit 5*a* and the fixing unit 5*b* at the target positions is realized by a simple mechanism. A mechanism for positioning the heating unit 5*a* and the fixing unit 5*b* will be described below.

[Mechanism for Positioning Heating Unit 5*a* and Fixing Unit 5*b*]

As shown in FIG. 9, the two supporting column portions 11 are composed of a first supporting column portion 11*a* arranged on the front side of the image forming apparatus 10 and a second supporting column portion 11*b* arranged on the rear side of the image forming apparatus 10.

As shown in FIG. 8 and FIG. 9, the two beam portions 12 are formed to extend in the left-right direction (width direction) D2 below the heating unit 5*a* and the fixing unit 5*b* (see FIG. 3), and are spaced apart in the front-rear direction D1.

The two beam portions 12 are connected to the two supporting column portions 11. For example, the two beam portions 12 are connected to the two supporting column portions 11 by welding.

The two beam portions 12 include a first beam portion 12*a* arranged on the front side of the image forming apparatus 10 and a second beam portion 12*b* arranged on the rear side of the image forming apparatus 10.

As shown in FIG. 3, the fixing unit 5*b* is arranged between the heating unit 5*a* and the two supporting column portions 11.

The first support 54 of the heating unit 5*a* is mounted on the two beam portions 12 in a state of being bridged over the two beam portions 12. Similarly, the second support 55 of the fixing unit 5*b* is mounted on the two beam portions 12 in a state of being bridged over the two beam portions 12.

In other words, neither the heating unit 5*a* nor the fixing unit 5*b* is fixed to the main body frame 1*x* by fasteners such as screws.

As shown in FIG. 10 and FIG. 11, the heating unit 5*a* and the fixing unit 5*b* are placed on the two beam portions 12 in a state where the longitudinal directions thereof extend along the front-rear direction D1.

The heating unit 5*a* and the fixing unit 5*b* are arranged side by side in the left-right direction (width direction) D2. That is, the left-right direction D2 is the direction in which the heating unit 5*a* and the fixing unit 5*b* are arranged. The left-right direction D2 is a width direction that intersects with the front-rear direction D1.

As shown in FIG. 3 and FIG. 10, the image forming apparatus 10 further includes an action member 6 (an example of an action member according to the present disclosure), a compression spring 60 (an example of the unit biasing member according to the present disclosure), and an interlocking mechanism 7 (an example of an interlocking mechanism according to the present disclosure). The action member 6 and the compression spring 60 are arranged inside the main body 1.

The action member 6 is supported inside the main body 1 so as to be movable between a first position and a second position. The action member 6 is movable along the left-right direction D2. FIG. 3 and FIG. 10 show the action member 6 in the first position. FIG. 4 and FIG. 11 show the action member 6 in the second position.

The action member 6 and the heating unit 5*a*, when in the first position, sandwich the compression spring 60 (see FIG. 3). That is, the first position is a position where the action member 6 is arranged such that the compression spring 60 is sandwiched between the action member 6 and the heating unit 5*a*, and the heating unit 5*a* is at the reference position. The second position is a position separated farther toward a side (left side) from the fixing unit 5*b* than the first position (see FIG. 4). That is, the second position is a position where the action member 6 is arranged at a position separated farther toward a side (left side) from the fixing unit 5*b* than the first position, and the heating unit 5*a* is at the retracted position.

The compression spring 60 is an elastic member. As shown in FIG. 3, the compression spring 60 is arranged inside the main body 1 on the opposite side of the heating unit 5*a* from the fixing unit 5*b* side. More specifically, the compression spring 60 is arranged on the left side of the first support 54 of the heating unit 5*a*. For example, the compression spring 60 is supported by a protruding portion 544 provided at a left end portion of the first support 54 so as to be able to expand and contract in the left-right direction D2.

The compression spring 60 applies a bias to the first support 54 toward the second support 55 with an elastic force when the action member 6 is at the first position. FIG. 3 shows a state in which the first support 54 is elastically biased toward the second support 55 by the compression spring 60.

The biasing force F1 (see FIG. 3) of the compression spring 60 against the first support 54 is greater than the static friction force of the heating unit 5*a* and the fixing unit 5*b* with respect to the two beam portions 12.

The first support 54 has one or more ribs 541 contacting upper surfaces of the two beam portions 12. Similarly, the second support 55 has a plurality of ribs 551 (see FIG. 3) contacting upper surfaces of the two beam portions 12. The rib or ribs 541 of the first support 54 and the ribs 551 of the second support 55 are provided for reducing the static friction force.

The compression spring 60 applies a bias to the first support 54 to bring the first support 54 into contact with the second support 55. Further, the compression spring 60 applies a bias to the first support 54 to bring the second support 55 into contact with the two supporting column portions 11. That is, the compression spring 60 applies a bias to the second support 55 via the first support 54.

As shown in FIG. 3 and FIG. 4, the first support 54 has a plurality of first fitting portions 542. Each of the first fitting portions 542 is formed in a recessed shape and is open to a side (right side in the present embodiment) of the first support 54. Each of the first fitting portions 542 is provided at an end portion of the first support 54 on the side of the fixing unit 5*b*. The first support 54 has four first fitting portions 542 formed spaced apart in the front-rear direction D1 and the up-down direction D3.

The second support 55 has a plurality of second fitting portions 553. Each of the second fitting portions 553 is formed in a protruding shape so as to be able to fit into each of the plurality of first fitting portions 542. The second support 55 has four second fitting portions 553 corresponding to the four first fitting portions 542.

As shown in FIG. 3, the compression spring 60 applies a bias to the first support 54 so that inner surfaces of the recessed portions of the four first fitting portions 542 come into contact with the four second fitting portions 553. In the present embodiment, the inner surfaces of the four first fitting portions 542 are portions that come into contact with the fixing unit 5*b* by the biasing force received from the compression spring 60, and are examples of contact portions according to the present disclosure. That is, the four first fitting portions 542 include the contact portions.

In addition, by fitting the second fitting portions 553 into the first fitting portions 542, the relative movement of the first support 54 and the second support 55 in the up-down direction D3 is restricted.

Note that the second support 55 may have the first fitting portions 542 and the first support 54 may have the second fitting portions 553.

In addition, as shown in FIG. 3 and FIG. 4, the second support 55 has a plurality of column contact portions 552 projecting toward the two supporting column portions 11. The plurality of column contact portions 552 contact the side surfaces of the two supporting column portions 11.

The interlocking mechanism 7 interlocks with rotational motion of the inner cover 102 when the opening portion 101 is opened and closed by the inner cover 102, and moves the heating unit 5*a* between the reference position and the retracted position. Here, the reference position is a position where a part of the contact portion of the heating unit 5*a* contacts the fixing unit 5*b*. In addition, the retracted position is a position separated a specified distance farther to a side (left side) from the fixing unit 5*b* than the reference position.

In the present embodiment, by interlocking with the rotating motion of the inner cover 102, the interlocking mechanism 7 moves the action member 6 along the left-right direction D2. Note that the inner cover 102 is rotated by being operated by the operator.

The interlocking mechanism 7, by interlocking by the rotating motion of the inner cover 102, moves the action member 6 from one of the first position and the second position to the other.

The interlocking mechanism 7 moves the action member 6 from the first position (position shown in FIG. 3) to the second position (position shown in FIG. 4) when the inner cover 102 rotates from the second closed position (see FIG. 10) to the second open position (see FIG. 11).

Further, the interlocking mechanism 7 moves the action member 6 from the second position to the first position when the inner cover 102 rotates from the second open position to the second closed position.

When the action member 6 moves from the first position to the second position, the heating unit 5*a* moves from the reference position to the retracted position in conjunction with the movement of the action member 6 (see FIG. 3 and FIG. 4).

When the action member 6 moves from the second position to the first position, the heating unit 5*a* moves from the retracted position to the reference position in conjunction with the action member 6 (see FIG. 3 and FIG. 4).

FIG. 3 and FIG. 10 show a state in which the heating unit 5*a* is at the reference position. FIG. 4 and FIG. 11 show a state in which the heating unit 5*a* is at the retracted position.

The reference position is a position where the heating unit 5*a* is arranged when the heating unit 5*a* contacts the fixing unit 5*b* (see FIG. 3 and FIG. 10).

When the heating unit 5*a* is at the reference position, the four first fitting portions 542 of the heating unit 5*a* come in contact with the four second fitting portions 553 of the fixing unit 5*b*.

The retracted position is a position where the heating unit 5*a* is arranged when the heating unit 5*a* is separated from the fixing unit 5*b* (see FIG. 4 and FIG. 11).

When the heating unit 5*a* moves from the reference position to the retracted position, the four first fitting portions 542 are separated from the four second fitting portions 553 (see FIG. 4).

Note that positioning the heating unit 5*a* at the reference position is synonymous with positioning the first support 54 at the reference position. In addition, positioning the heating unit 5*a* at the retracted position is synonymous with positioning the first support 54 at the retracted position.

When the heating unit 5*a* is positioned at the retracted position, the fixing unit 5*b* can be pulled out from the inside of the main body 1 in a removal direction D11 (see FIG. 11). The fixing unit 5*b* has a handle (not shown) that is gripped by hand when it is pulled out from the inside of the main body 1. The fixing unit 5*b* is pulled out from the inside of the main body 1 without coming into contact with the heating unit 5*a*. The removal direction D11 is a direction along the front-rear direction D1.

The fixing unit 5*b* can pass through the opening portion 101 of the partition member 100 when the fixing unit 5*b* is pulled out from the main body frame 1*x*.

As shown in FIG. 3, when the heating unit 5*a* moves from the retracted position to the reference position, the four second fitting portions 553 are fitted to the four first fitting portions 542. Therefore, when the heating unit 5*a* is at the reference position, the four first fitting portions 542 of the heating unit 5*a* come in contact with the four second fitting portions 553 of the fixing unit 5*b*.

The first support 54 of the heating unit 5*a* has an engaged portion 543 that engages with a portion of the action member 6. In addition, the action member 6 also has an engaging portion 62 that can be engaged with the engaged portion 543 of the first support 54.

As shown in FIG. 4, the engaging portion 62 engages with the engaged portion 543 while the action member 6 is moving from the first position to the second position.

The heating unit 5*a* is engaged with the engaging portion 62 when the action member 6 moves from the first position to the second position. Thus, the heating unit 5*a* receives force from the action member 6 via the engaging portion 62, and moves from the reference position to the retracted position (see FIG. 4).

On the other hand, when the action member 6 moves from the second position to the first position along the left-right direction D2, the engaging portion 62 and the engaged portion 543 are disengaged.

When the action member 6 further moves toward the first position after the engagement between the engaging portion 62 and the engaged portion 543 is disengaged, the action member 6, via the compression spring 60, applies a bias to the first support 54 of the heating unit 5*a* toward the fixing unit 5*b* (see FIG. 3).

When the action member 6 moves from the second position to the first position, the heating unit 5*a* receives an elastic force from the action member 6 via the compression spring 60, and thereby moves from the retracted position to the reference position (see FIG. 3).

When the action member 6 is at the first position, the four first fitting portions 542 of the heating unit 5*a* are brought into contact with the four second fitting portions 553 of the fixing unit 5*b* by the biasing force received from the compression spring 60 (see FIG. 3).

The heating unit 5*a* and the fixing unit 5*b* are positioned in the left-right direction D2 by being sandwiched between the compression spring 60 and the two supporting column portions 11. The heating unit 5*a* is positioned at the reference position by fitting the four first fitting portions 542 to the second fitting portions 553 and coming into contact with the fixing unit 5*b*.

In addition, the compression spring 60, by an elastic force, applies a bias to the heating unit 5*a* toward the fixing unit 5*b*. Thus, the mechanical play of the interlocking mechanism 7 is prevented from adversely affecting the positioning of the heating unit 5*a*.

As shown in FIG. 10, in this embodiment, the interlocking mechanism 7 includes an interlocking member 71, a tension spring 72, a first link member 73, and a second link member 74.

The interlocking member 71 is movably supported between a predetermined regulating position (position shown in FIG. 10) and a predetermined release position (position shown in FIG. 11) along the front-rear direction D1. FIG. 10 shows a state in which the interlocking member 71 is at the regulating position. FIG. 11 shows a state in which the interlocking member 71 is at the release position.

In addition, the action member 6 has a first projecting portion 61 projecting in an opposite direction to the heating unit 5*a* side. The interlocking member 71 has a second projecting portion 711 projecting toward the action member 6 side.

The tension spring 72 is an elastic member that applies a bias to the action member 6 in a direction away from the fixing unit 5*b*. The tension spring 72 is an example of a retraction biasing member.

The biasing force F2 (see FIG. 4) of the tension spring 72 against the action member 6 is greater than the static frictional force of the heating unit 5*a* with respect to the two beam portions 12.

The first link member 73 is connected to the interlocking member 71 by a first connecting shaft 713. In the present embodiment, the interlocking member 71 has an arm portion 712 extending toward the inner cover 102. The first connecting shaft 713 connects the arm portion 712 and the first link member 73.

The second link member 74 is connected to the first link member 73 by a second connecting shaft 731. Furthermore, the second link member 74 is connected with the inner cover 102 by a third connecting shaft 741.

The second link member 74 is supported by a second supporting shaft 740. The second link member 74 is rotatable about the second supporting shaft 740.

The first link member 73, the first connecting shaft 713, the second connecting shaft 731, the second link member 74, and the third connecting shaft 741 are link mechanisms that convert the rotational motion of the inner cover 102 into the linear motion of the interlocking member 71.

Due to the action of the link mechanism, the interlocking member 71 moves from the regulating position to the release position in conjunction with the rotational motion of the inner cover 102 from the second closed position to the second open position. Similarly, due to the action of the link mechanism, the interlocking member 71 moves from the release position to the regulating position in conjunction with the rotational motion of the inner cover 102 from the second open position to the second closed position.

The first projecting portion 61 has a first inclined side surface 61*a* (see FIG. 10 and FIG. 11) formed so as to incline from a base portion toward a top portion. Similarly, the second projecting portion 711 has a second inclined side surface 711*a* (see FIG. 10 and FIG. 11) that is formed so as to incline from the base portion toward the top portion.

When the interlocking member 71 moves from the regulating position to the release position, the second inclined side surface 711*a* slides in a downward direction over the first inclined side surface 61*a*. The downward direction is a direction from the top portion of the first projecting portion 61 to the base portion thereof.

As the second inclined side surface 711*a* slides over the first inclined side surface 61*a* in the downward direction, the action member 6 is moved from the first position to the second position by the biasing force of the tension spring 72 (see FIG. 11).

On the other hand, when the interlocking member 71 moves from the release position to the regulating position, the second inclined side surface 711*a* slides in an upward direction over the first inclined side surface 61*a*. The upward direction is the direction from the base portion of the first projecting portion 61 to the top portion thereof.

As the second inclined side surface 711*a* slides over the first inclined side surface 61*a* in the upward direction, the action member 6 is moved from the second position to the first position against the biasing force of the tension spring 72 by the force received from the second projecting portion 711 (see FIG. 10).

In the present embodiment, the second inclined side surface 711*a* of the second projecting portion 711 is an example of a sliding portion that contacts the first inclined side surface 61*a*.

Note that the first inclined side surface 61*a* is an example of a sliding portion that contacts the second inclined side surface 711*a*.

That is, when the interlocking member 71 moves from the regulating position to the release position, the first inclined side surface 61*a* slides in a downward direction over the second inclined side surface 711*a*. The downward direction in this case is a direction from the top portion of the second projecting portion 711 to the base portion thereof.

By the first inclined side surface 61*a* sliding over the second inclined side surface 711*a* in the downward direction, the action member 6 is moved from the first position to the second position by the biasing force of the tension spring 72 (see FIG. 11).

On the other hand, when the interlocking member 71 moves from the release position to the regulating position, the first inclined side surface 61*a* slides in an upward direction over the second inclined side surface 711*a*. The upward direction is the direction from the base portion of the second projecting portion 711 to the top portion thereof.

As the first inclined side surface 61*a* slides over the second inclined side surface 711*a* in the upward direction, the action member 6 is moved from the second position to the first position against the biasing force of the tension spring 72 by the force received from the second projecting portion 711 (see FIG. 10).

Note that the interlocking mechanism 7 may include a gear mechanism such as a rack and pinion mechanism. In that case as well, the interlocking mechanism 7 converts the rotational motion of the inner cover 102 to the movement of the action member 6 along the left-right direction D2.

In addition, the heating unit 5*a* and the fixing unit 5*b* are positioned in the up-down direction D3 by being placed on the two beam portions 12. The loads of the heating unit 5*a* and the fixing unit 5*b* limit the upward movement of the heating unit 5*a* and the fixing unit 5*b*.

In addition, the image forming apparatus 10 further includes a cover biasing mechanism 8 (see FIG. 10 and FIG. 11) attached to an inner surface of the inner cover 102. Further, the second support 55 of the fixing unit 5*b* also has a beam contact portion 554 protruding downward from the bottom surface (see FIG. 3, FIG. 4, and FIG. 8).

As shown in FIG. 10, the cover biasing mechanism 8 includes a third spring 80, a spring case 81, and a cap portion 82.

The spring case 81 accommodates the third spring 80. The cap portion 82 is movably attached to the spring case 81. The third spring 80 is an example of an elastic biasing member that applies a bias to the fixing unit 5*b* toward the rear side.

The third spring 80 is sandwiched between the inner cover 102 and the second support 55 of the fixing unit 5*b* when the inner cover 102 is positioned at the second closed position. In the present embodiment, the third spring 80 and the cap portion 82 are sandwiched between the inner cover 102 and the second support 55.

As shown in FIG. 10, the third spring 80, by being sandwiched between the inner cover 102 and the second support 55, applies a bias to the second support 55 in the mounting direction D12 by elastic force. The mounting direction D12 is opposite to the removal direction D11.

In addition, when the inner cover 102 is positioned at the second closed position, a force that the second support 55 receives from the third spring 80 causes the beam contact portion 554 to contact a side surface of one of the two beam portions 12. In the present embodiment, the beam contact portion 554 contacts the side surface of the second beam portion 12*b*.

The fixing unit 5*b* is positioned in the front-rear direction D1 by the action of the third spring 80 and the beam contact portion 554.

Note that the cover biasing mechanism 8 may be attached to the second support 55 of the fixing unit 5*b*.

[Control Portion 150]

The control portion 150 performs overall control of the image forming apparatus 10. The control portion 150 is an example of a heating control portion according to the present disclosure, and controls the heater 51 of the heating unit 5*a*. In addition, the control portion 150 is an example of a determination portion according to the present disclosure.

As shown in FIG. 12, the control portion 150 has a CPU 151, a ROM 152, a RAM 153, an EEPROM 154 (registered trademark), and the like. The ROM 152 is a non-volatile storage device, the RAM 153 is a volatile storage device, and the EEPROM 154 is a non-volatile storage device. The RAM 153 and EEPROM 154 are used as temporary memory for various types of processes executed by the CPU 151. In addition, the ROM 152 stores a predetermined control program. In the present embodiment, the control portion 150 executes a cover state detection process, which will be described later, by the CPU 151 performing arithmetic processing according to the control program. Note that the control portion 150 may be configured by an electronic circuit such as an integrated circuit (ASIC, DSP).

As described above, the heater 51 and the temperature sensor 56 are connected to the control portion 150. The control portion 150 controls the heater 51 based on a detection signal from the temperature sensor 56.

In the present embodiment, in a case where the front cover 10*a* is closed in a state in which the inner cover 102 is not properly closed and therefore the fixing unit 5*b* is not properly attached to the fixing device 5, the control portion 150 uses the existing temperature sensor 56 to determine whether the internal cover 102 is properly closed (executes a cover state detection process). By performing this cover state detection process, even when the inner cover 102 is not closed properly and the front cover 10*a* is closed in a state in which the fixing unit 5*b* is not properly attached, it is possible, without adding a separate sensor, to determine that the closed state of the internal cover 102 is not sufficient, and thus it is also possible to determine a non-attached state in which the fixing unit 5*b* is not attached properly. Therefore, it is possible to achieve a safe image forming apparatus 10 without the heating operation being performed excessively due to the heater 51 being heated in an unattached state.

[Cover State Detection Process]

Figure 13:
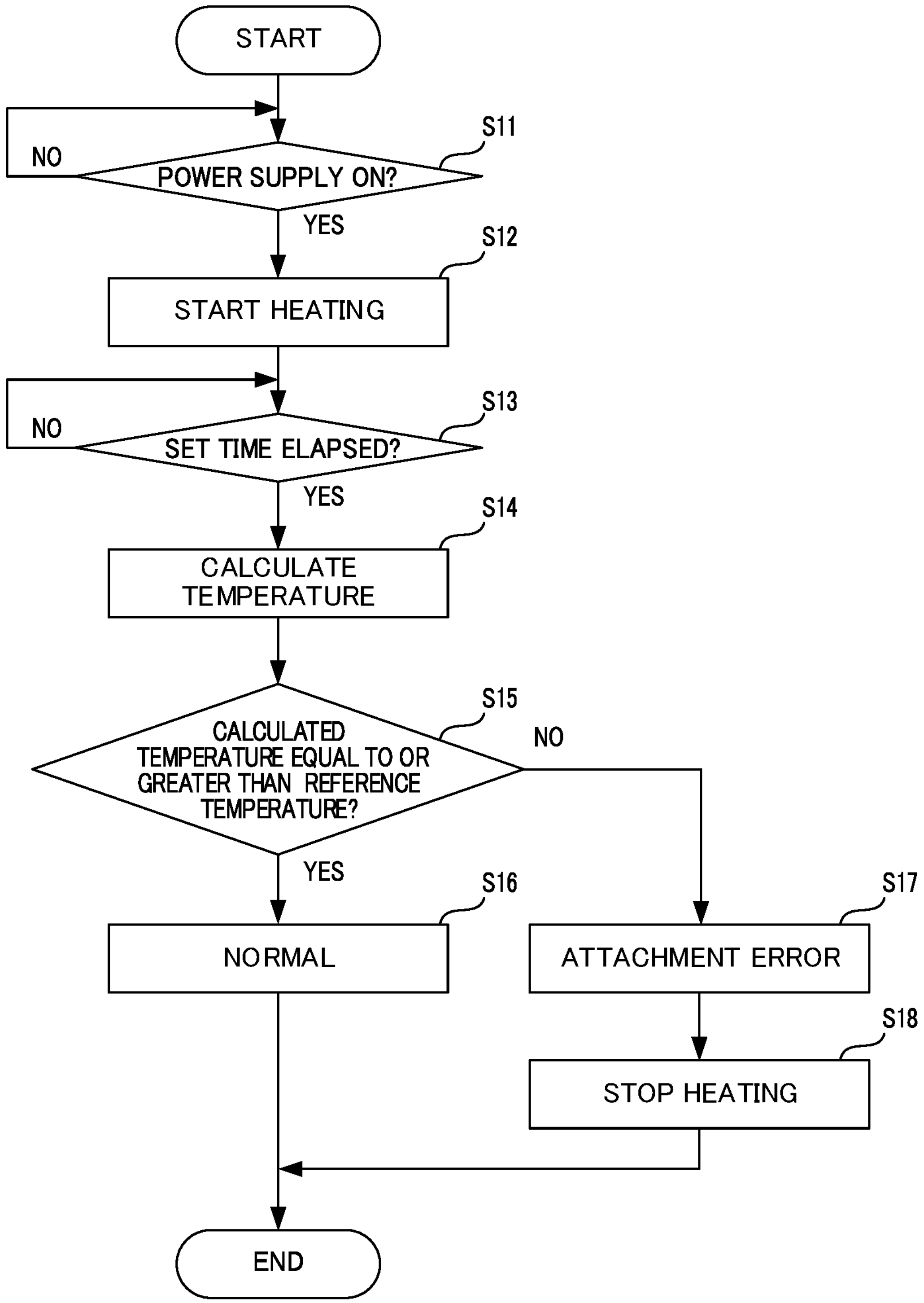
FIG. 13 is a flowchart showing an example of a procedure of a cover state detection process executed by the control portion of the image forming apparatus according to the embodiment.

An example of the procedure of the cover state detection process executed by the image forming apparatus 10 will be described below with reference to the flowchart of FIG. 13. Here, S11, S12, and so on in FIG. 13 represent numbers of processing procedures (steps). Note that the cover state detection process is executed in a case in which, after the power supply to the image forming apparatus 10 is turned OFF and the fixing unit 5*b* has been replaced, the inner cover 102 was not properly closed and the power supply was turned ON while the fixing unit 5*b* was not attached.

When the front cover 10*a* is closed in a state in which the inner cover 102 is not sufficiently closed, and after that the power-supply operation portion 201 is operated, the power supply to the image forming apparatus 10 is switched from OFF to ON (S11). By the power supply being switched from OFF to ON, it is possible to determine that the front cover 10*a* is closed. Note that in a case where a cover sensor for detecting the open and closed state of the front cover 10*a* is provided, it is possible, after the power supply is turned ON and after the cover sensor confirms the closed state of the front cover 10*a* by the control portion 150, to perform the process starting from step S12.

When the power supply is turned ON, the control portion 150 drives the heater 51 to start heating by the heater 51 (S12).

In the next step S13, the control portion 150 determines whether or not a predetermined set time has elapsed since the heating by the heater 51 was started. Here, the set time is a time such that the temperature detected by the temperature sensor 56 becomes equal to or higher than a predetermined reference temperature when the heater 51 is heated while the fixing unit 5*b* is properly attached. In addition, the set time is a time such that the temperature detected by the temperature sensor 56 is less than the reference temperature in a case where the heater 51 is heated in the non-attached state in which the fixing unit 5*b* is not properly attached. Note that the reference temperature is an example of a predetermined threshold value according to the present disclosure.

When the set time has elapsed since the heater 51 started heating, the control portion 150 calculates the temperature based on the detection signal from the temperature sensor 56 (S14).

In the next step S15, the control portion 150 determines whether or not the calculated temperature calculated in step S14 is equal to or higher than the reference temperature.

In step S15, when it is determined that the calculated temperature is equal to or higher than the reference temperature, the control portion 150 determines that the inner cover 102 is properly closed and the fixing unit 5*b* is properly attached (S15). After that, the series of processing ends. Note that in a case where the inner cover 102 is properly closed and the fixing unit 5*b* is mounted properly, the heating unit 5*a* is arranged at the reference position, and thus the heating of the fixing belt 52 by the heater 51 is performed properly. Therefore, the calculated temperature becomes equal to or higher than the reference temperature.

On the other hand, when it is determined in step S15 that the calculated temperature is lower than the reference temperature, the control portion 150 determines that the inner cover 102 is not properly closed and the fixing unit 5*b* is not properly attached, and thus outputs an attachment error (S17). After that, the driving of the heater 51 is stopped (S18), and the series of processing ends. Note that in a case where the inner cover 102 is not properly closed, the heating unit 5*a* is arranged at the retracted position, and thus the distance from the heater 51 to the fixing belt 52 becomes long, It becomes difficult for the magnetic force of the heater 51 to reach the conductive base material of the fixing belt 52, the density of the lines of magnetic force in the conductive base material becomes small, and the fixing belt 52 cannot be raised to the reference temperature within the set time. Therefore, in a case were the calculated temperature is lower than the reference temperature, it is possible to determine that the inner cover 102 is not properly closed.

As described above, in the present embodiment, the cover state detection process is executed by the control portion 150, and thus it is possible to determine whether the inner cover 102 is properly closed by using the existing temperature sensor 56 without adding a separate sensor.

[Supplementary Notes]

An outline of the disclosure extracted from the above-described embodiments will be added below. Note that each configuration and each processing function described in the supplementary notes below may be selected and combined arbitrarily.

<Supplementary Note 1>

An image forming apparatus, including:

an apparatus main body;

a heating unit (5*a*) arranged along a first direction (D1) inside the apparatus main body and having a heater;

a fixing unit (5*b*) arranged along the first direction (D1) so as to be adjacent to a side of the heating unit inside the apparatus main body and having a fixing member heated by the heater, and a pressure member configured to apply a bias to a sheet toward the fixing member;

a first cover member supported by the apparatus main body so as to be rotatable between a first closed position that closes a side surface on one side in the first direction of the apparatus main body and a first open position that opens the side surface;

an opening portion provided on the side surface and having an opening for attaching and detaching the fixing unit to and from the apparatus main body;

a second cover member provided on the side surface and supported by the apparatus main body so as to be rotatable between a second closed position that closes the opening portion and a second open position that opens the opening portion;

an interlocking mechanism configured to interlock with a rotational motion of the second cover member rotating between the second closed position and the second open position, and move the heating unit between a reference position where a contact portion of the heating unit contacts the fixing unit and a retracted position that is separated farther from the fixing unit than the reference position;

an operating portion provided on the side surface and configured to operate to turn ON or OFF a power supply; and an operation portion provided on the first cover member, and capable of operating the operating portion in a state in which the first cover member is arranged at the first closed position.

<Supplementary Note 2>

The image forming apparatus according to Supplementary Note 1, further including:

a temperature sensor capable of detecting a temperature of the fixing member;

a heating control portion configured to, in a case where the first cover member is rotated from the first closed position to the first open position, execute a heating operation for heating the heater that is stopped; and a determination portion configured to determine that the second cover member is open in a case where the temperature detected by the temperature sensor after the heating operation is executed is less than a predetermined threshold.

<Supplementary Note 3>

The image forming apparatus according to Supplementary Note 2, wherein the heating control portion executes the heating operation for only a predetermined set time on condition that the first cover member is rotated from the first closed position to the first open position; and the determination portion determines whether the detected temperature is less than the threshold after the set time has elapsed, and determines that the second cover member is open in a case where the detected temperature is less than the threshold.

<Supplementary Note 4>

The image forming apparatus according to Supplementary Note 2 or 3, wherein the heating control portion stops driving the heater in a case where the determination portion determines that the second cover member is open.

<Supplementary Note 5>

The image forming apparatus according to any one of Supplementary Notes 1 to 4, wherein the interlocking mechanism includes:

a unit biasing member, which is an elastic member arranged on a side opposite to the fixing unit side with respect to the heating unit inside the apparatus main body; and an action member arranged inside the apparatus main body, and movably supported between a first position where together with the heating unit sandwiches the unit biasing member and a second position separated farther from the fixing unit than the first position; wherein the heating unit is positioned at the reference position by a biasing force received from the unit biasing member when the action member is at the first position;

the action member has an engaging portion configured to engage with a portion of the heating unit when moving from the first position to the second position;

the interlocking mechanism is configured to move the action member from the first position to the second position in a case where the second cover member rotates from the second closed position to the second open position, and in that movement process, the heating unit, by being engaged with the engaging portion, is moved from the reference position to the retracted position separated farther from the fixing unit than the reference position; and furthermore the interlocking mechanism, is configured to move the action member from the second position to the first position by the biasing force of the unit biasing member in a case where the second cover member rotates from the second open position to the second closed position.

<Supplementary Note 6>

The image forming apparatus according to any one of Supplementary Notes 1 to 5, wherein the heater is an electromagnetic induction heating type heating device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

an apparatus main body;

a heating unit arranged along a first direction inside the apparatus main body and having a heater;

a fixing unit arranged along the first direction so as to be adjacent to a side of the heating unit inside the apparatus main body and having a fixing member heated by the heater, and a pressure member configured to apply a bias to a sheet toward the fixing member;

a first cover member supported by the apparatus main body so as to be rotatable between a first closed position that closes a side surface on one side in the first direction of the apparatus main body and a first open position that opens the side surface;

an opening portion provided on the side surface and having an opening for attaching and detaching the fixing unit to and from the apparatus main body;

a second cover member provided on the side surface and supported by the apparatus main body so as to be rotatable between a second closed position that closes the opening portion and a second open position that opens the opening portion;

an interlocking mechanism configured to interlock with a rotational motion of the second cover member rotating between the second closed position and the second open position, and move the heating unit between a reference position where a contact portion of the heating unit contacts the fixing unit and a retracted position that is separated farther from the fixing unit than the reference position;

an operating portion provided on the side surface and configured to operate to turn ON or OFF a power supply;

an operation portion provided on the first cover member, and capable of operating the operating portion in a state in which the first cover member is arranged at the first closed position;

a temperature sensor capable of detecting a temperature of the fixing member;

a heating control portion configured to, in a case where the first cover member is rotated from the first closed position to the first open position, execute a heating operation for heating the heater that is stopped; and a determination portion configured to determine that the second cover member is open in a case where the temperature detected by the temperature sensor after the heating operation is executed is less than a predetermined threshold.

2. The image forming apparatus according to claim 1, wherein the heating control portion executes the heating operation for only a predetermined set time on condition that the first cover member is rotated from the first closed position to the first open position; and the determination portion determines whether the detected temperature is less than the threshold after the set time has elapsed, and determines that the second cover member is open in a case where the detected temperature is less than the threshold.

3. The image forming apparatus according to claim 1, wherein the heating control portion stops driving the heater in a case where the determination portion determines that the second cover member is open.

4. An image forming apparatus, comprising:

an apparatus main body;

a heating unit arranged along a first direction inside the apparatus main body and having a heater;

a fixing unit arranged along the first direction so as to be adjacent to a side of the heating unit inside the apparatus main body and having a fixing member heated by the heater, and a pressure member configured to apply a bias to a sheet toward the fixing member;

a first cover member supported by the apparatus main body so as to be rotatable between a first closed position that closes a side surface on one side in the first direction of the apparatus main body and a first open position that opens the side surface;

an opening portion provided on the side surface and having an opening for attaching and detaching the fixing unit to and from the apparatus main body;

a second cover member provided on the side surface and supported by the apparatus main body so as to be rotatable between a second closed position that closes the opening portion and a second open position that opens the opening portion;

an interlocking mechanism configured to interlock with a rotational motion of the second cover member rotating between the second closed position and the second open position, and move the heating unit between a reference position where a contact portion of the heating unit contacts the fixing unit and a retracted position that is separated farther from the fixing unit than the reference position;

an operating portion provided on the side surface and configured to operate to turn ON or OFF a power supply; and an operation portion provided on the first cover member, and capable of operating the operating portion in a state in which the first cover member is arranged at the first closed position, wherein the interlocking mechanism includes:

a unit biasing member, which is an elastic member arranged on a side opposite to the fixing unit side with respect to the heating unit inside the apparatus main body; and an action member arranged inside the apparatus main body, and movably supported between a first position where together with the heating unit sandwiches the unit biasing member and a second position separated farther from the fixing unit than the first position; wherein the heating unit is positioned at the reference position by a biasing force received from the unit biasing member when the action member is at the first position;

the action member has an engaging portion configured to engage with a portion of the heating unit when moving from the first position to the second position;

the interlocking mechanism is configured to move the action member from the first position to the second position in a case where the second cover member rotates from the second closed position to the second open position, and in that movement process, the heating unit, by being engaged with the engaging portion, is moved from the reference position to the retracted position separated farther from the fixing unit than the reference position; and furthermore the interlocking mechanism, is configured to move the action member from the second position to the first position by the biasing force of the unit biasing member in a case where the second cover member rotates from the second open position to the second closed position.

5. The image forming apparatus according to claim 1, wherein the heater is an electromagnetic induction heating type heating device.

6. The image forming apparatus according to claim 4, wherein the heater is an electromagnetic induction heating type heating device.

* * * * *